(12) United States Patent
Trainer et al.

(10) Patent No.: US 9,853,512 B2
(45) Date of Patent: Dec. 26, 2017

(54) STATOR WINDING ARRANGEMENT FOR AN ELECTRICAL MACHINE HAVING SERIES CONNECTED SHORT AND LONG WINDINGS

(71) Applicant: ROLLS-ROYCE PLC, London (GB)

(72) Inventors: David Reginald Trainer, Derby (GB); Konstantinos Kampisios, Nottingham (GB); Omar Fadhel Jasim, Nottingham (GB); Ellis Fui Hen Chong, Derby (GB); John James Anthony Cullen, Derby (GB)

(73) Assignee: ROLLS-ROYCE plc, London (GB)

( * ) Notice: Subject to any disclaimer, the term of this patent is extended or adjusted under 35 U.S.C. 154(b) by 62 days.

(21) Appl. No.: 14/332,879

(22) Filed: Jul. 16, 2014

(65) Prior Publication Data

US 2015/0035395 A1 Feb. 5, 2015

(30) Foreign Application Priority Data

Jul. 31, 2013 (GB) .................................. 1313684.1

(51) Int. Cl.
*H02K 3/00* (2006.01)
*H02K 3/04* (2006.01)
(Continued)

(52) U.S. Cl.
CPC ................. *H02K 3/04* (2013.01); *H02K 1/16* (2013.01); *H02K 3/28* (2013.01); *H02K 3/48* (2013.01);
(Continued)

(58) Field of Classification Search
CPC .. H02K 3/28; H02K 3/04; H02K 3/48; H02K 1/16; H02K 21/12; H02K 11/046;
(Continued)

(56) References Cited

U.S. PATENT DOCUMENTS 4,161,680 A * 7/1979 Akamatsu .............. H02K 29/06
318/722
6,144,136 A * 11/2000 Umeda .................. H02K 1/243
29/596

(Continued)

FOREIGN PATENT DOCUMENTS

CN 202068252 U 12/2011
GB 330790 6/1930

OTHER PUBLICATIONS

Phase Shifting for Harmonic Cancellation, from Controlled Power Company dating Jul. 29, 1999, Application Notes XP-002756265 p. 1, Procedure, col. 3, vol. 23.*
(Continued)

*Primary Examiner* — Michael Andrews
*Assistant Examiner* — Maged Almawri
(74) *Attorney, Agent, or Firm* — Oliff PLC (57) ABSTRACT

Described is an electrical machine, including: a rotor having a magnetic flux source mounted thereto; a stator winding arrangement having a first set of electrical connections to provide a first output channel, and a second set of electrical connections to provide a second output channel, the first and second channels being electrically out of phase, wherein the stator winding arrangement is constructed from a plurality of winding portions which are connected in electrical series.

11 Claims, 5 Drawing Sheets

(51) Int. Cl.
*H02K 3/28* (2006.01)
*H02K 1/16* (2006.01)
*H02K 3/48* (2006.01)
*H02K 21/12* (2006.01)
*H02K 11/04* (2016.01)
*H02K 3/12* (2006.01)

(52) U.S. Cl.
CPC .............. *H02K 21/12* (2013.01); *H02K 3/12* (2013.01); *H02K 11/04* (2013.01); *H02K 11/046* (2013.01); *H02K 11/048* (2013.01); *Y02E 10/725* (2013.01)

(58) Field of Classification Search
CPC .. H02K 3/12; H02K 3/16; H02K 3/38; H02K 3/40; Y02E 10/725
USPC .................. 310/89, 71, 179–210, 184, 68 D
See application file for complete search history.

(56) References Cited

U.S. PATENT DOCUMENTS

| | | | | |
|---|---|---|---|---|
| 6,201,332 B1* | 3/2001 | Umeda | .................... | H02K 3/12 310/179 |
| 6,847,185 B2* | 1/2005 | Kume | .................... | H02P 23/06 318/732 |
| 6,940,202 B1* | 9/2005 | Chen | .................... | H02K 3/14 310/180 |
| 7,075,206 B1 | 7/2006 | Chen | | |
| 7,595,612 B2* | 9/2009 | Ganev | .................... | H02P 9/10 322/44 |
| 7,710,081 B2* | 5/2010 | Saban | .................... | H02K 3/28 290/4 R |
| 7,928,623 B2* | 4/2011 | Lacaze | .................... | H02K 3/28 310/179 |
| 2002/0017825 A1* | 2/2002 | Oohashi | .................... | H02K 3/12 310/207 |
| 2005/0242676 A1* | 11/2005 | Fujikawa | ................. | H02K 3/28 310/179 |
| 2006/0006655 A1* | 1/2006 | Kanazawa | ............ | H02J 7/1492 290/40 B |
| 2006/0186749 A1* | 8/2006 | Strydom | ................ | H02K 53/00 310/103 |
| 2006/0267440 A1* | 11/2006 | Sakai | ....................... | H02K 3/12 310/184 |
| 2008/0012444 A1* | 1/2008 | Hattori | ..................... | H02K 3/28 310/198 |
| 2008/0067984 A1* | 3/2008 | Anghel | ................... | F01D 15/10 322/52 |
| 2008/0129137 A1* | 6/2008 | Edelson | .................. | H02K 3/12 310/159 |
| 2009/0121575 A1* | 5/2009 | Wolf | ........................ | H02K 3/28 310/203 |
| 2009/0322082 A1* | 12/2009 | Wagoner | ............... | H02M 5/458 290/44 |
| 2011/0095638 A1* | 4/2011 | Sakata | ................... | H02K 23/20 310/179 |

OTHER PUBLICATIONS

NPL Search Results IQQuickExport201704251754.*
Phase Shifting for Harmonic Cancellation dating 1999.*
Search Report issued in British Patent Application No. 1313684.1 dated Dec. 30, 2013.
Apr. 25, 2016 Search Report issued in European Patent Application No. 14 177 275.6.
"Phase Shifting for Harmonic Cancellation". Controlled Power Company. vol. 23., pp. 1-3, 1999.
"Three-Phase Alternator". Integrated Publishing. 2011.

* cited by examiner

STATOR WINDING ARRANGEMENT FOR AN ELECTRICAL MACHINE HAVING SERIES CONNECTED SHORT AND LONG WINDINGS

TECHNICAL FIELD OF INVENTION

This invention relates to a winding arrangement for an electrical machine. In particular, the invention relates to a stator winding for a synchronous machine which is driven in use by a variable speed prime mover. The invention finds particular utility where electrical power is provided to a network or load via a 12 pulse rectifier arrangement.

BACKGROUND OF INVENTION

Permanent Magnet, PM, electrical machines provide robust and compact motors and generators in many industries, such as aerospace for powers up to several 10's of kW's and marine propulsion systems and wind turbine plants up to and potentially above 5 MW.

The fixed magnets located on the rotor of a PM machine result in a rotating magnetic field having a constant magnitude. This means that the magnitude and frequency of the generated output voltage varies with the rotor speed. In aerospace applications, the rotor speed will be generally controlled by and proportional to the speed of the gas turbine jet engine and the drive shaft taken from one of the spools. In current applications, this speed may vary during a flight cycle by as much as 10:1 which relates to significant changes in voltage and frequency beyond acceptable limits for many applications. Consequently, the variable voltage and frequency is conditioned by a fully rated AC to DC converter which is arranged to produce a constant DC voltage by controlling the reactive power flow in the machine stator windings.

In marine propulsion systems shaft generators driven by the main propulsion engine(s) to provide electrical power are limited by the fact that the ship's electrical system normally requires a fixed frequency. This means that engine speed has to be kept constant which is generally inefficient. The use of a power electronics converter in a marine electrical network has the benefit that the main engine can operate at an optimum speed to maximise its efficiency, effectively decoupling it from the requirement to operate at fixed speed to support the fixed frequency marine electrical network.

Figure 1:
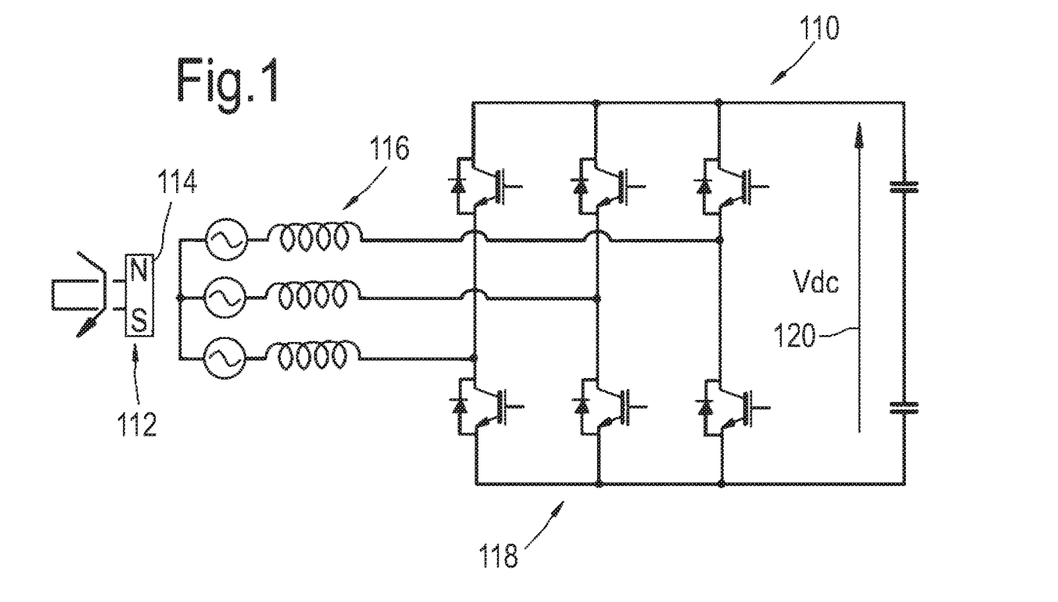
FIG. 1 shows a typical drive arrangement for providing a DC voltage from a PM machine.

FIG. 1 shows a typical drive arrangement 110 for providing a DC voltage from a PM machine. Thus, there is depicted a machine rotor 112 which carries a permanent magnet 114 and which is driveably connected to a prime mover, for example a gas turbine engine via an appropriate transmission (not shown). The rotor 112 is rotatably located within the stator 116 of the machine such that a voltage is induced in the stator windings upon rotation of the permanent magnet. The stator is electrically connected to and outputs current to an active converter 118 which is operated to provide a constant DC voltage 120 for a load (not shown).

Figure 2:
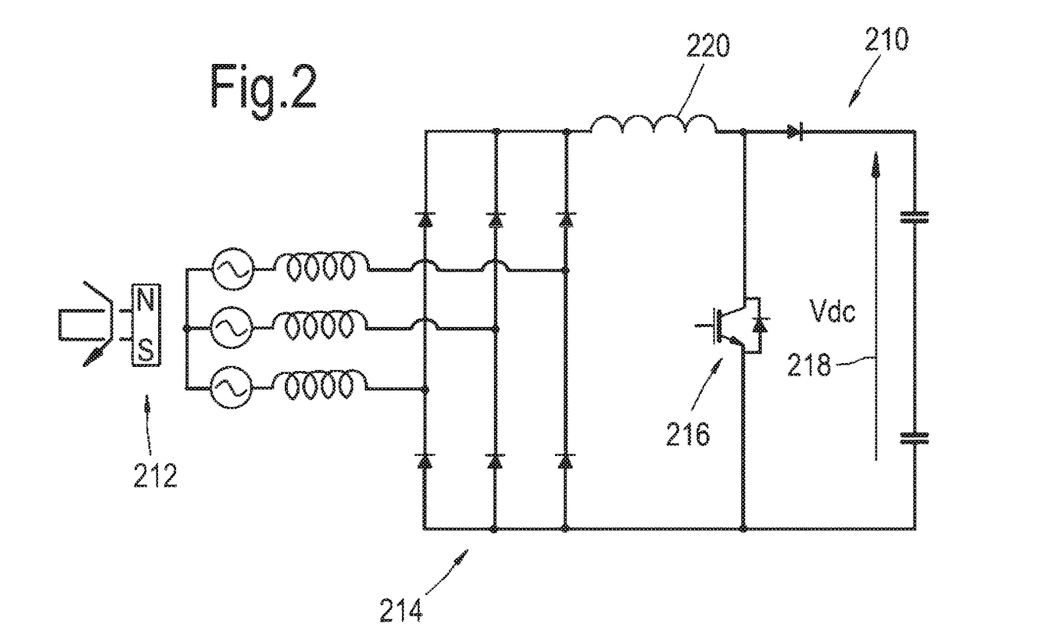
FIG. 2 shows an electrical system which includes a PM machine which outputs a current to a 6-pulse diode rectifier and single transistor DC to DC converter.

In many applications, the PM machine is only required to act as an electrical power generator in which case the fully active, bidirectional converter as shown in FIG. 1 is unnecessary and a simpler unidirectional conditioning scheme can be used. FIG. 2 shows an electrical system 210 which includes a PM machine 212 which outputs a current to a 6-pulse diode rectifier 214 and single transistor DC to DC converter 216. Here the 6-pulse diode rectifier 214 converts the variable magnitude, variable frequency voltage provided by the PM machine 212 to a variable magnitude direct voltage. This is conditioned by the DC to DC converter 216 to provide a constant direct voltage to a direct voltage 218 power bus. It will be appreciated that in some applications, the inductor 220 shown as part of the DC to DC converter can be effectively replaced in favour of the PM machine stator windings. U.S. Pat. No. 7,595,612 provides an example of a drive similar to that shown in FIG. 2.

A drawback with the simple arrangement shown in FIG. 2 is that the use of a 6 pulse rectifier introduces significant levels of 5th and 7th harmonic currents into the system and stator windings. These currents are parasitic in that they do not contribute to the useful electrical power generated and create additional heating in the stator windings, thereby reducing the current carrying capacity. Further, the harmonic currents cause eddy current heating in the permanent magnets of the rotor and create additional torque oscillations in the mechanical drive train.

It is known that providing a 12-pulse system can help reduce the 5th and 7th harmonic currents in the PM machine. A two channel approach is known to construct 12-pulse transformer-rectifier system in high power electrical power transmission and distribution systems, and a similar approach may be applicable to a PM machine. Another known configuration is a 6 pulse synchronous system achieved by connecting the stator windings in a star and delta configuration which provides two channels electrically displaced 30 degrees.

Figure 3A:
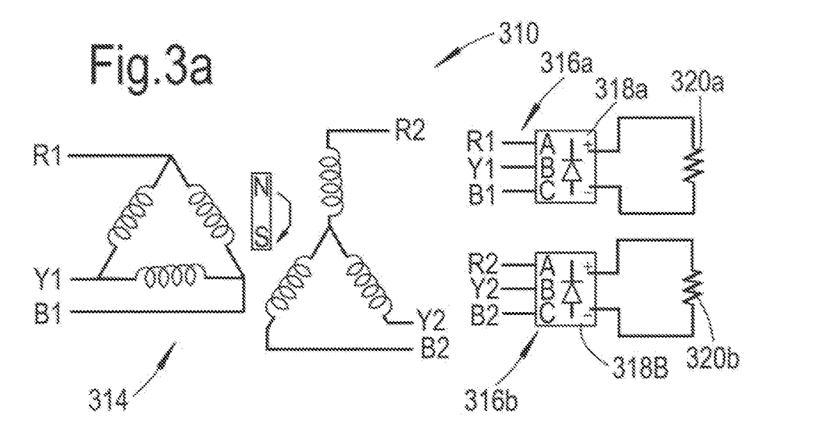
FIG. 3a shows a PM machine with a star-delta winding arrangement which provides two channels which are 30 degrees out of phase.
Figure 3B:
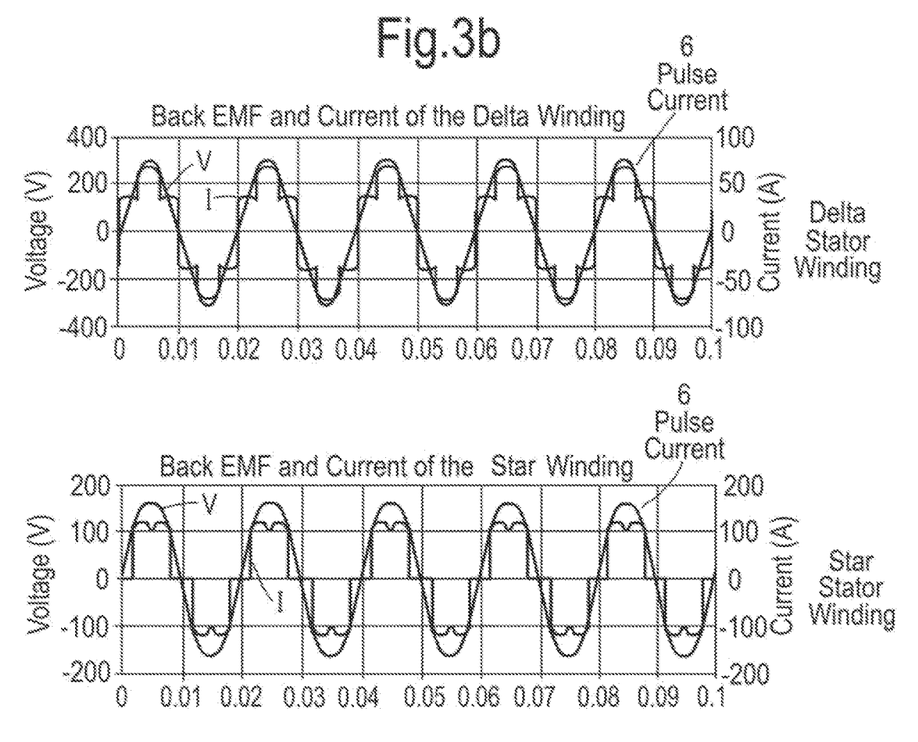
FIG. 3b shows the voltage waveforms for the star and delta windings with the respective 6 pulse current harmonics.

The arrangement 310 shown in FIG. 3a includes a star-delta (YD) stator winding 314 arrangement to provide the two channels 316a,b which are 30 degrees out of phase with one another. The two channels 316a,b are connected to respective 6 pulse diode rectifiers 318a,b which each feed respective loads 320a,b. The $5^{th}$ and $7^{th}$ harmonic currents can be calculated and analysed after an FFT analysis and also measuring the Total Harmonic Distortion (THD) As can be seen from FIG. 3b, the 30 degree phase shift provided by the YD windings 314 results in the 5th and 7th harmonic currents being out of phase so as to largely cancel out one another within the stator. This reduces rotor eddy current heating and the torque ripple seen by the rotor.

Although this provides an improvement over the PM machine with conventional stator windings, the YD stator windings 314 are overly complex and do not address the additional current flow in the windings which still suffer from parasitic power dissipation as a result of the 5th and 7th harmonics.

The present invention seeks to provide an improved PM machine for DC systems.

STATEMENTS OF INVENTION

The present invention provides an electrical system comprising an electrical machine, comprising: a rotor having a magnetic flux source mounted thereto; a stator winding arrangement having a first set of electrical connections to provide a first output channel, and a second set of electrical connections to provide a second output channel, the first and second channels being electrically out of phase, wherein the stator winding arrangement is constructed from a plurality of winding portions connected in electrical series, wherein each output channel is connected to a load or network.

Having a stator winding which is tapped at various points to provide a plurality of winding portions allows a two channel machine to be provided in a compact way with fewer losses than known systems.

The winding portions may comprise a plurality of alternately connected long and short windings.

The output channels may be poly phase and the short windings may provide the phase difference between the two output channels in that each phase of the first channel is taken from one end of a short winding. Each phase of the second channel may be taken from the respective other end of the short winding.

The first and second output channels may be approximately 30 degrees out of phase.

A third channel may be taken from the midpoint of the short winding for each phase.

The stator may include slots and turns of each long winding may be located in the same slot as turns of at least one short winding. All of the stator slots of a stator pole may be occupied by both the long and short windings. The long and short windings may be arranged around the stator such that the circumferential pole length of the long and short windings are the same.

The magnetic flux source may be a permanent magnet.

The stator winding arrangement may be three phase.

The electrical machine may have three or more output channels.

Each channel may be connected to the load or network via a DC converter.

In a yet further aspect, the invention provides an aircraft, marine vessel or wind turbine having the electrical machine or the electrical system of the preceding aspects.

DESCRIPTION OF DRAWINGS

Embodiments of the invention will now be described with the aid of the following drawings in which.

DETAILED DESCRIPTION OF INVENTION

Figure 4:
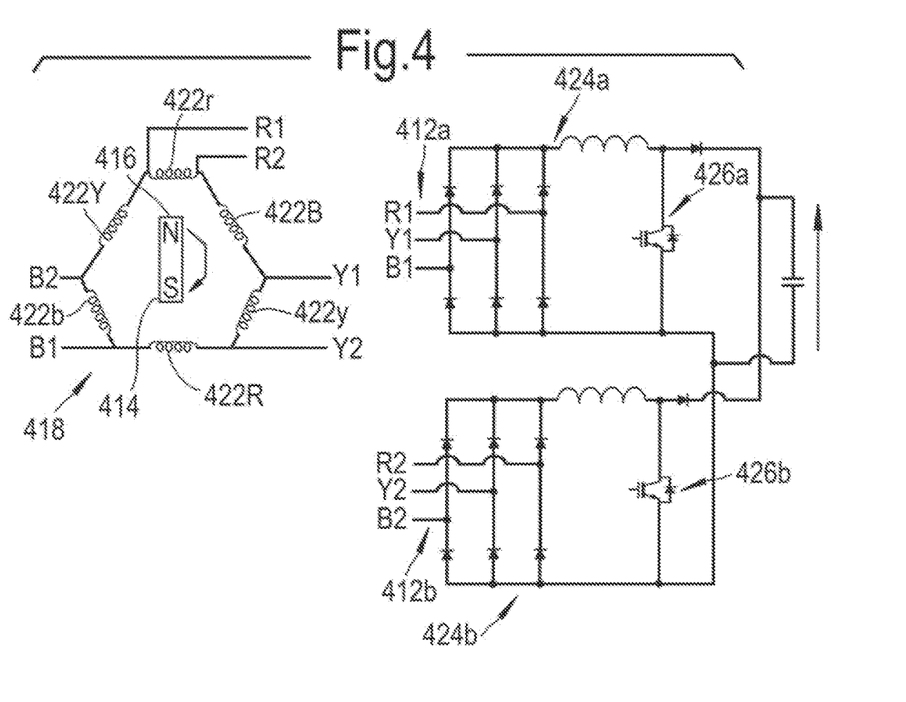
FIG. 4 shows a schematic diagram of an electrical machine according to the present invention.

FIG. 4 shows a schematic representation of an electrical machine 410 in the form of a synchronous machine which is driven by a variable speed drive. The machine in this instance is a permanent magnet machine and as such produces an electrical output having variable magnitude and frequency which is dependent on the speed of the drive, as described above.

In order to provide a constant electrical output for a network or load, the electrical machine 410 has two electrical outputs or channels 412a,b which are electrically offset from one another. That is, the electrical outputs are electrically out of phase by a predetermined amount.

Figure 6A:
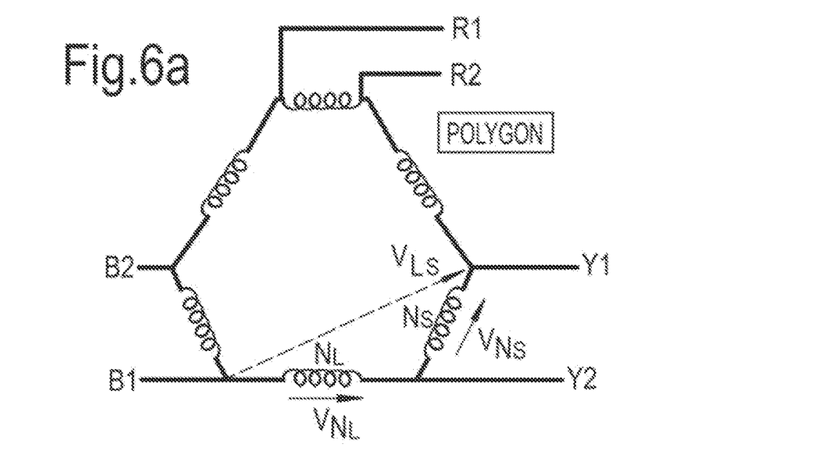
FIGS. 6a and 6b show the phasor arrangement of the windings.
Figure 6B:
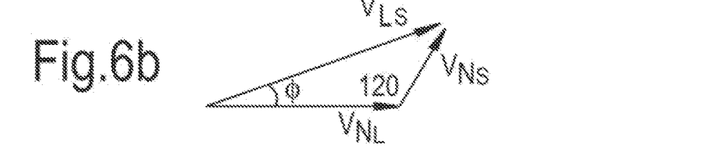

The determination of the degree of phase shift between the channels 412a,b is described in detail below with reference to FIGS. 6a and 6b, but is generally provided by having an electrical machine 410 including a rotor 414 having a magnetic flux source mounted thereto; a stator winding arrangement 418 having a first set of electrical connections R1, Y1, B1, to provide the first output channel 412a and a second set of electrical connections R2, Y2, B2, to provide the second output channel 412b in which the first 412a and second 412b channels are electrically out of phase. The stator winding arrangement 418 is constructed from a plurality of winding portions which are connected in electrical series to provide a plurality of electrical tapping points between adjacent winding portions. The winding portions are arranged such that the tapping points provide two phase sets. The phase connections in a given phase set are equally distributed about the stator winding so as to be (in the three phase case) 120 degrees out of phase, with each phase set being 30 degrees out of phase.

Thus, as shown in FIG. 4, there is a three phase stator winding 418 which can provide a first phase set of electrical connections R1, Y1, B1 which are placed at 0, 120 and 240 degrees around the winding 418, and a second set R2, Y2, B2 which are placed at 30, 150 and 270 degrees, with the 0 and 30, 120 and 150, and 240 and 270 connection points each nominally representing the respective red R1, R2, yellow Y1, Y2, and blue B1, B2, phases of each channel 412a,b.

More generally, there is provided a polyphase stator winding arrangement having a plurality of serially connected windings arranged to provide n phases, where in each phase includes at least two electrical terminals which are electrically offset from one another by a predetermined and equal amount so as to provide the electrical machine with 2n phases sets which are electrically out of phase from each other.

The electrical machine 410 finds particular utility for providing an electrical generating system which provides power to DC converters which suffer from $5^{th}$ and $7^{th}$ harmonic current distortions as described above. Thus, in the described embodiment, the two electrical channels 412a,b are connected to two six diode bridge rectifier 424a,b and converter 426a,b arrangements which rectify the alternating current outputted from the PM machine 410 into DC which is the passed through a basic chopper circuit for adjusting the magnitude of the output DC voltage. Other arrangements of rectifying converter arrangement are possible and other areas of application for the two channel machine are envisaged within the scope of the invention.

The invention is particularly advantageous as it provides a machine having low harmonic current distortion in the dominant stator windings, low levels of induced eddy current flow in the rotor and reduced torque ripple on the mechanical drive train which provides torque to the rotor. The improvement in stator and rotor current waveforms will lead to less localised heating and therefore the requirement for less cooling.

The stator windings 418 are made up from a plurality of long and short windings 422R,r,Y,y,B,b, which are connected in electrical series and arranged so as to provide a 30 degree phase shift across the short windings 422r,y,b. The stator arrangement is three phase, with each phase being represented by a short 422r,y,b and a long 422R,Y,B winding, with the two being opposite one another as shown in FIG. 4.

FIG. 4 shows the electrical connection of the windings 422R,r,Y,y,B,b. However, providing a physical series connection of windings 422R,r,Y,y,B,b around the stator in this way in a practical machine is not desirable because of the large harmonics that would arise in the air gap due to the stators space harmonics. Rather, it is preferable to distribute the turns of the short winding 422r,y,b equally across the slots of its associated long winding 422R,Y,B to reduce the space harmonics. In this way turns of the long winding 422R,Y,B are associated with and in the same slot as turns of the short winding 422r,y,b.

The windings of a pole may partially overlap or fully overlap around the stator pole pitch. Where there is a partial overlap, it is necessary to ensure that the mid-point of the long and short windings are co-located with respect to the stator. This will ensure that the voltages in the long and short windings are in phase with one another. Hence, in a stator having six slots per pole, all six slots may be occupied by turns of the long winding, with the middle two additionally occupied by the short windings. In this way, the mid-points of the long and short windings are co-located with each other and the mid-point of the pole. As shown below, a preferred embodiment includes both the long and short windings being common to all of the slots of a given pole to reduce the space harmonics.

Figure 5A:
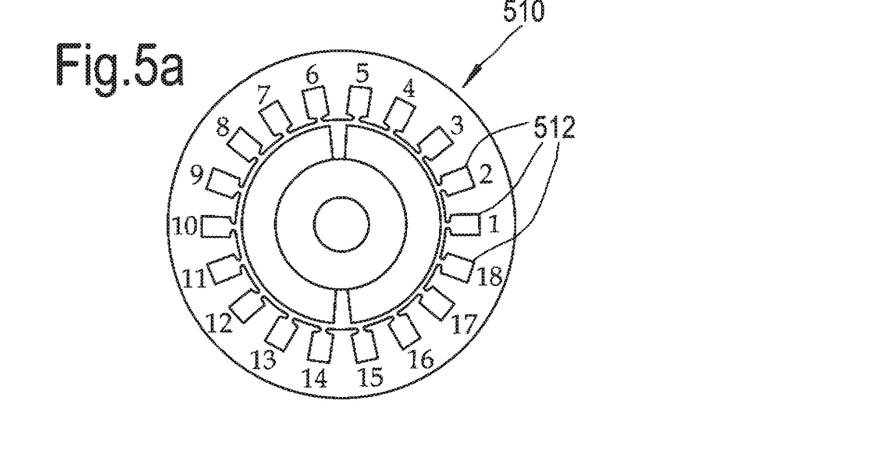
FIGS. 5a and 5b show an axial section of a 2 pole electrical machine and the associated winding arrangement.
Figure 5B:
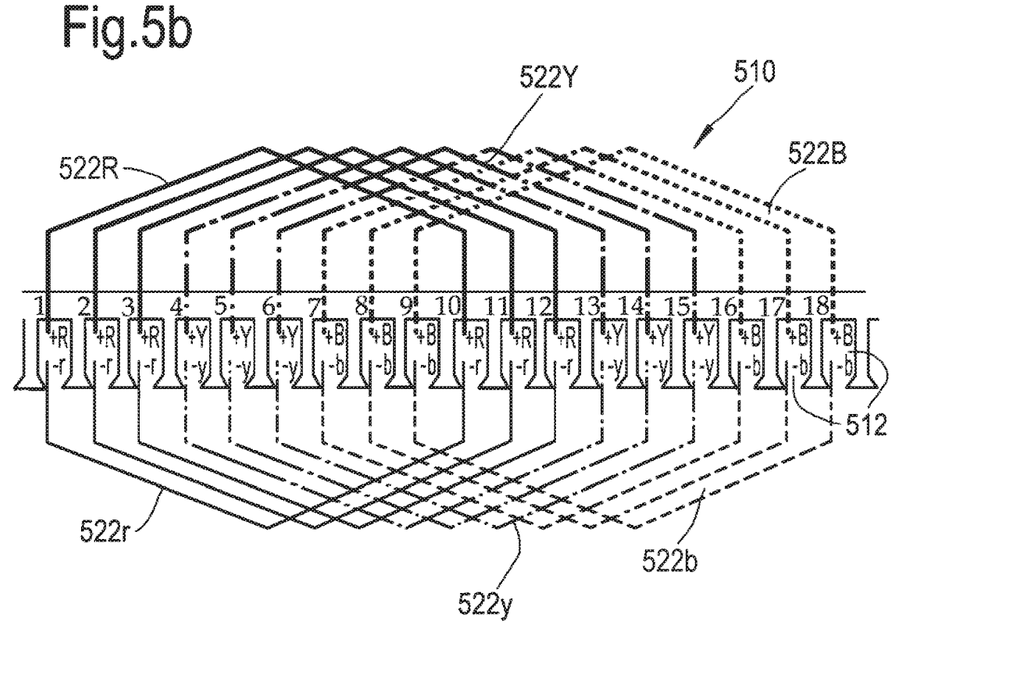

FIG. 5a shows a schematic representation of a stator 510 in axial section having circumferentially distributed slots 512 (1-18) for the windings 522R,r,Y,y,B,b arranged around a rotor. FIG. 5b shows a corresponding windings 522R,r,Y,y,B,b for the stator slots 512 of FIG. 5a. Hence, FIG. 5b represents the stator 510 in an unwrapped state so as to more readily show the arrangement of the individual windings 522R,r,Y,y,B,b.

In the described embodiment a two pole machine is shown having a stator 510 which includes eighteen slots 512 evenly distributed around the circumference of the machine. This provides three slots per pole per phase. The selection of a two pole machine is for illustration only and should not be taken to limit the scope of the invention.

With reference to FIG. 5b the long windings 522R,Y,B are shown above the slots 512, the short windings 522r,y,b below with the +/− signs depicting the direction of the winding direction in which + indicates the winding is travelling out of the paper as shown, whilst − indicates the winding travelling into the paper. R, Y and B denote the long windings and r, y, b denote the short windings.

Both the long 522R,Y,B and the short 522r,y,b windings are distributed windings and the connections between the phases are such that it provides the polygonal arrangement shown in FIG. 4. The connections between the windings 522R,r,Y,y,B,b are not shown in FIG. 5b for the sake of clarity but the skilled person will appreciate that from an analysis of the two drawings that slots 1 and 10 are partially filled with turns of the red phase long winding 522R before slots 2 and 11, and then 3 and 12 are partially filled to provide a distributed pole. The same applies to the red phase short winding 522r and the long 522Y,B and short 522y,b windings of the other phases in their respective slots 512. As will be appreciated, the extent of filling in each case is determined by multiple factors including the number of turns required, conductor size and available filling factor etc. This will be application specific and determined at least in part by the required phase shift required across each of the short windings.

Once the distributed windings are in place for each of the long 522R,Y,B and short 522r,y,b windings and for each phase there will be two conductor ends per winding which are connected to provide the polygonal winding arrangement shown in FIG. 4, with appropriate tapping points for terminal connections. Hence, one end of the red phase short winding 522r in slot 3 is connected to the end of the yellow phase long winding 522Y in slot 4, and the other end of the yellow phase long winding 522Y in slot 6 is connected with the adjacent end of the blue phase short winding 522B in slot 7 and so on. The outputs for R1 and R2 shown on FIG. 4 are taken from the connection between slots 1 and 4, and slots 3 and 18 respectively.

To provide the necessary phase shift between the ends of the short windings (and long windings) whilst having the windings in the same slots requires the windings to have the necessary relative electrical length. In order to do this the number of turns for the long and short windings are selected to provide a desired voltage ratio. The equations set out below and explained with reference to FIGS. 6a and 6b can be used to determine the necessary ratio.

FIG. 4 shows a polygon winding arrangement 418 according to the invention. Thus, there is provided a three phase winding having nominal red, yellow and blue phases. Each of the phases includes a long 422R,Y,B and short 422r,y,b winding which are physically arranged within the stator 418 as described above. The phase vector diagram for one of the electrically adjacent long 422R,Y,B and short 422r,y,b windings is shown in FIG. 6a and FIG. 6b. Hence, from the polygon vector diagram:

$$\frac{V_{LS}}{\sin(120°)} = \frac{V_{NS}}{\sin\phi} = \frac{V_{NL}}{\sin(60° - \phi)}$$

With the polygon long winding 422R,Y,B voltage being defined by:

$$V_{NL} = \left(\frac{2}{\sqrt{3}}\right) V_{LS} \sin(60° - \phi)$$

And the polygon short winding 422r,y,b voltage being defined by:

$$V_{NS} = \left(\frac{2}{\sqrt{3}}\right) V_{LS} \sin\phi$$

From the polygon vector drawing it can be found that:

$$\tan\phi = \frac{V_{NS} \cdot \sin(60°)}{V_{NL} + V_{NS} \cdot \cos(60°)}$$

And so for a turns ratio given by $$n = \frac{V_{NL}}{V_{NS}},$$

the angle φ can be calculated as:

$$\phi = \tan^{-1}\frac{\sqrt{3}}{(1+2n)}$$

Where φ is the phase shift required across the short winding 422r,y,b. Hence, setting φ to a predetermined amount, 30 degrees in the described embodiment, provides the required turns ratio for the long 422R,Y,B and short 422r,y,b windings via n. For a phase shift of approximately 30 degrees, the short windings 422r,y,b have approximately a third of the turns of the long windings 422R,Y,B.

The difference in the winding lengths and the voltages leads to different currents flowing through the long windings 422R,Y,B relative to the short windings 422r,y,b. It has been shown in one exemplary machine that the power provided from the long windings 422R,Y,B was 47.75 kW and the power from the short windings 422r,y,b was 13.21 kW, making the total power from machine 60.96 kW. Thus, the short windings 422r,y,b provided 27.6% of the power of the long windings 422R,Y,B whilst having 36.6% of the voltage due to the different electrical length of the windings. This results in a short winding 422r,y,b current flow of around three-quarters of that in the long winding 422R,Y,B. This means the short winding 422r,y,b can be made from thinner section conductor whilst operating at the same current density as the long winding 422R,Y,B.

Figure 7:
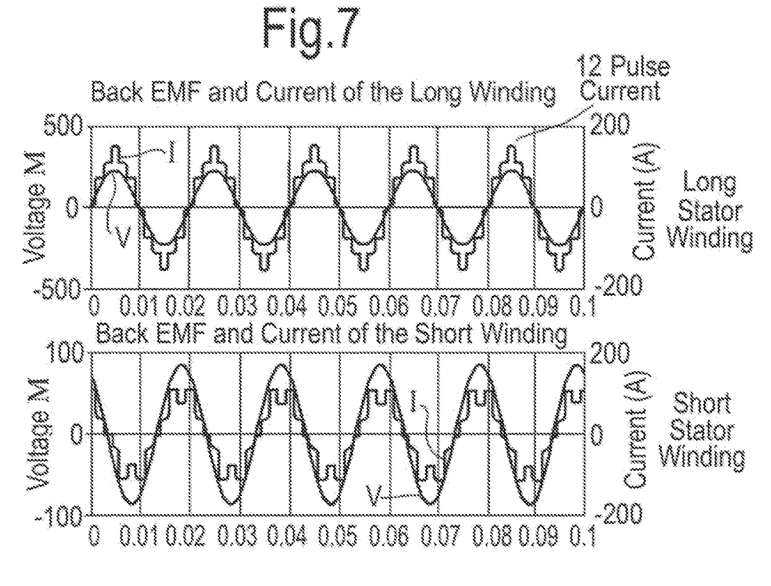
FIG. 7 shows the voltages and currents of both the long and short windings (12 pulse winding arrangement) within the stator winding arrangement for an exemplary machine.

FIG. 7 shows electrical voltage and current wave forms for the long and short winding with the respective 12 pulse currents being shown on each. As a result of the 12 pulse winding arrangement the $5^{th}$ and $7^{th}$ harmonic currents in the short and long winding correspondingly will be out of phase (30 degrees) and thus largely cancelling one another within the stator winding. The elimination of the $5^{th}$ and $7^{th}$ harmonic current could be analysed after FFT analysis of the current waveforms. Thus, the invention provides a relatively compact winding arrangement for an electrical machine which can provide output waveforms which are substantially free of $5^{th}$ and $7^{th}$ harmonic currents. It will also be noted that the voltages and currents in both the long and short windings are in phase, meaning that there is no reactive power within these windings, therefore less losses, less heating effort and also reduced power rate of the machine. The compact nature of the machine can be further increased in embodiments where the rectifier and converter are co-located within the electrical machine, thus providing a DC generator which requires minimal electronic control circuitry.

Figure 8:
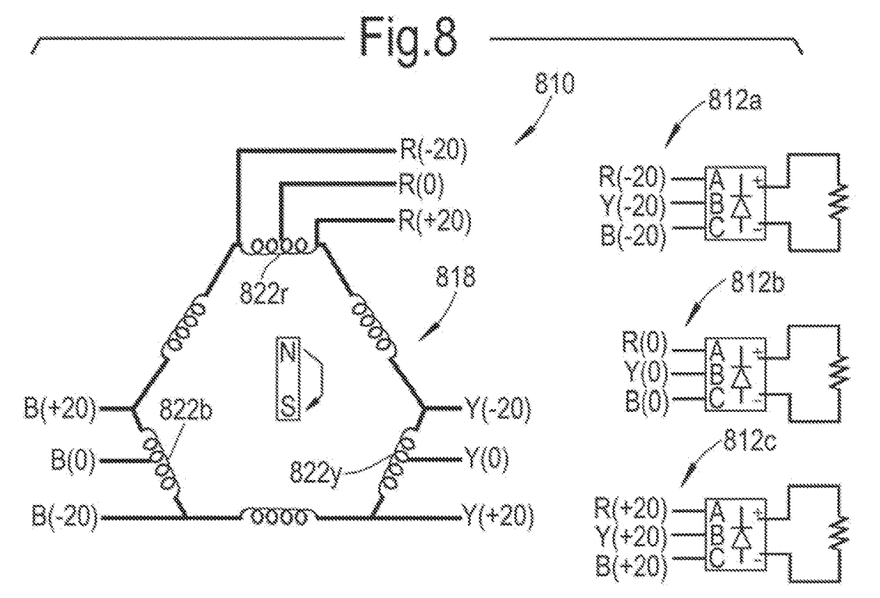
FIG. 8 shows the implementation of the invention to provide an 18 pulse electrical machine.

The principles of the invention can be extended to cover other embodiments. For example, FIG. 8 shows an 18 pulse electrical machine 810 in which the stator windings 818 provide three channels 812a-c, which are 20 degrees out of phase from one another. The three channels are provided by tapping the windings at either end of the short windings 822r,y,b and a mid-point as illustrated. The Total Harmonic Distortion is reduced using the 18 pulse polygon but the power rating of PM machine is higher as there is a small phase shift between voltages and currents in the short windings. This results in some reactive power flow. Other embodiments, such as 24 pulse machines are also envisaged.

The electrical machine described in the above examples is a permanent magnetic machine. However, it will be appreciated that the invention may be applied to other suitable electrical machines where appropriate. For example, the invention may find application in a wound field synchronous machine. Further, although the present invention is particularly advantageous to applications having variable speed drives, it may be applicable in scenarios which utilise a constant speed prime mover. It will also be appreciated, that the phase shift of 30 degrees and 20 degrees achieved across the windings should be taken as approximate. A phase shift which achieves significant cancellation of the $5^{th}$ and $7^{th}$ harmonics in 12 and 24 pulse machines respectively is considered to be within the scope of the claims.

The invention claimed is:

1. An electrical system comprising:
    an electrical machine, having:
        a rotor having a magnetic flux source mounted thereto; and
        a stator winding arrangement having a first set of electrical connections to provide a first output channel, and a second set of electrical connections to provide a second output channel, the first and second channels being electrically out of phase, wherein
    the stator winding arrangement is constructed from a plurality of winding portions comprising a plurality of alternately connected long and short windings connected in electrical series, wherein adjacent long and short windings have different phases,
    each output channel is connected to a load or network, the output channels being polyphase and the short windings providing the phase difference between the two output channels in that each phase of the first channel is taken from one end of a short winding, and each phase of the second channel is taken from the respective other end of the short winding, and
    the stator includes slots, and turns of each long winding of a phase are located in the same slot as turns of the one short winding of the same phase.

2. An electrical system as claimed in claim 1 wherein the first and second output channels are approximately 30 degrees out of phase.

3. An electrical system as claimed in claim 1, further comprising
    a third channel which is taken from the midpoint of the short winding for each phase.

4. An electrical system as claimed in claim 1, wherein the long and short windings are arranged around the stator such that the mid-point of the windings are located at the mid-point of a stator pole.

5. An electrical system as claimed in claim 1, wherein all of the stator slots of a stator pole include turns of both the long and short windings.

6. An electrical system as claimed in claim 1 wherein the magnetic flux source is a permanent magnet.

7. An electrical system as claimed in claim 1 wherein the stator winding arrangement is three phase.

8. An electrical system as claimed in claim 1 having three or more output channels.

9. An electrical system as claimed in claim 1, wherein each channel is connected to the load or network via a DC converter.

10. An aircraft, marine vessel or wind turbine having the electrical system of claim 1.

11. An electrical system comprising:
    an electrical machine, having:
        a rotor having a magnetic flux source mounted thereto;
        a stator winding arrangement having a first set of electrical connections to provide a first output channel, and a second set of electrical connections to provide a second output channel, the first and second channels being electrically out of phase; and
        a third channel, wherein
- the stator winding arrangement is constructed from a plurality of winding portions comprising a plurality of alternately connected long and short windings connected in electrical series,
- each output channel is connected to a load or network, the output channels being polyphase and the short windings providing the phase difference between the two output channels in that each phase of the first channel is taken from one end of a short winding, and each phase of the second channel is taken from the respective other end of the short winding,
- the stator includes slots, and turns of each long winding of a phase are located in the same slot as turns of the one short winding of the same phase, and
- the third channel is taken from the midpoint of the short winding for each phase.

* * * * *